United States Patent
Lai et al.

(10) Patent No.: US 8,051,083 B2
(45) Date of Patent: Nov. 1, 2011

(54) FORUM WEB PAGE CLUSTERING BASED ON REPETITIVE REGIONS

(75) Inventors: Wei Lai, Beijing (CN); Rui Cai, Beijing (CN); Jiangming Yang, Beijing (CN); Lei Zhang, Beijing (CN); Wei-Ying Ma, Beijing (CN)

(73) Assignee: Microsoft Corporation, Redmond, WA (US)

( * ) Notice: Subject to any disclaimer, the term of this patent is extended or adjusted under 35 U.S.C. 154(b) by 362 days.

(21) Appl. No.: 12/103,712

(22) Filed: Apr. 16, 2008

(65) Prior Publication Data

US 2009/0265363 A1  Oct. 22, 2009

(51) Int. Cl.
G06F 7/00 (2006.01)
G06F 17/30 (2006.01)

(52) U.S. Cl. ........ 707/737; 707/729; 707/730; 707/731; 715/700

(58) Field of Classification Search .......... None
See application file for complete search history.

(56) References Cited

U.S. PATENT DOCUMENTS

| | | | |
|---|---|---|---|
| 6,119,124 A | 9/2000 | Broder et al. | |
| 7,143,365 B2 * | 11/2006 | Gallella | 715/851 |
| 7,185,001 B1 * | 2/2007 | Burdick et al. | 1/1 |
| 7,225,397 B2 | 5/2007 | Fukuda et al. | |
| 7,293,007 B2 | 11/2007 | Ma et al. | |
| 2002/0188602 A1 * | 12/2002 | Stubler et al. | 707/3 |
| 2004/0199546 A1 * | 10/2004 | Calistri-Yeh et al. | 707/104.1 |
| 2005/0065959 A1 * | 3/2005 | Smith et al. | 707/102 |
| 2005/0120006 A1 | 6/2005 | Nye | |
| 2005/0246296 A1 | 11/2005 | Ma et al. | |
| 2005/0267915 A1 | 12/2005 | Zhulong et al. | |
| 2005/0278324 A1 | 12/2005 | Fan et al. | |
| 2006/0004717 A1 * | 1/2006 | Ramarathnam et al. | 707/3 |
| 2006/0143158 A1 * | 6/2006 | Ruhl et al. | 707/3 |
| 2007/0174269 A1 | 7/2007 | Jing et al. | |
| 2007/0208701 A1 | 9/2007 | Sun et al. | |
| 2007/0208703 A1 | 9/2007 | Shi et al. | |
| 2008/0010291 A1 | 1/2008 | Poola et al. | |
| 2008/0010292 A1 | 1/2008 | Poola | |
| 2008/0046441 A1 * | 2/2008 | Wen et al. | 707/100 |

(Continued)

FOREIGN PATENT DOCUMENTS

JP  2007-080061 A  3/2007

OTHER PUBLICATIONS

"Common layout extraction from Web pages" Webpage Available at http://sciencelinks.jp/j-east/article/200121/000020012101A0644892.php.

(Continued)

*Primary Examiner* — Khanh Pham
*Assistant Examiner* — Azam Cheema
(74) *Attorney, Agent, or Firm* — L. Alan Collins; Collins & Collins Incorporated (57) ABSTRACT

Described is a technology by which forum web pages are processed into clusters for classification purposes, including by determining repetitive regions between pages and associating pages that have similar repetitive regions into a common cluster. Patterns corresponding to the regions are determined, and a feature set based at least in part on those patterns (e.g., pattern frequency) is extracted from the page. The feature set of a page is compared against the feature set of another page to determine similarity therewith, e.g., via a feature space distance computation that is evaluated against a threshold distance.

16 Claims, 6 Drawing Sheets

U.S. PATENT DOCUMENTS

2008/0114800 A1* 5/2008 Gazen et al. .................. 707/101

OTHER PUBLICATIONS

He, et al., "ImageSeer: Clustering and Searching WWW Images Using Link and Page Layout Analysis", Apr. 1, 2004. Technical Report MSR-TR-2004-38. 12 Pages.

Bekkerman, et al.,"Web Page Clustering using Heuristic Search in the Web Graph", Proceedings of the Twentieth International Joint Conference on Artificial Intelligence. Hyderabad, India, Jan. 6-12, 2007. pp. 2280-2286.

Lage, et al., "Automatic generation of agents for collecting hidden Web pages for data extraction", Data & Knowledge Engineering 49 (2004). pp. 177-196.

Reis, et al., "Automatic Web News Extraction Using Tree Edit Distance", WWW2004, May 17-22, 2004, New York, USA. pp. 502-511.

Guo, et al., "Board Forum Crawling: A Web Crawling Method for Web Forum", Proceedings of the 2006 IEEE/WIC/ACM International Conference on Web Intelligence (WI 2006 Main Conference Proceedings). pp. 745-748.

Crescenzi, et al., "Clustering Web pages based on their structure", Data & Knowledge Engineering 54 (2005). pp. 279-299.

Brandman, et al., "Crawler-Friendly Web Servers", ACM SIGMETRICS Performance Evaluation Review archive vol. 28 , Issue 2 (Sep. 2000) pp. 1-16.

Baeza-Yates, et al., "Crawling a Country: Better Strategies than Breadth-First for Web Page Ordering", May 10-14, 2005, Chiba, Japan. 9 Pages.

Raghavan, et al., "Crawling the HiddenWeb", Proceedings of the 27th VLDB Conference, Roma, Italy, 2001. 10 Pages.

Glance, et al., "Deriving Marketing Intelligence from Online Discussion", KDD'05, Aug. 21-24, 2005, Chicago, Illinois, USA. pp. 419-428.

Manku, et al., "Detecting Near-Duplicates for Web Crawling", WWW 2007, May 8-12, 2007, Banff, Alberta, Canada. pp. 141-149.

Yossef, et al., "Do Not Crawl in the DUST: Different URLs with Similar Text", WWW 2007, May 8-12, 2007, Banff, Alberta, Canada. pp. 111-120.

Zhang, et al., "Expertise Networks in Online Communities: Structure and Algorithms", WWW 2007, May 8-12, 2007, Banff, Alberta, Canada. pp. 221-230.

Henzinger, et al., "Finding Near-Duplicate Web Pages: A Large-Scale Evaluation of Algorithms", SIGIR'06, Aug. 6-11, 2006, Seattle, Washington, USA. pp. 284-291.

Chakrabarti, et al., "Focused crawling: a new approach to topic-specific Web resource discovery", Published by Elsevier Science B.V. 1999. pp. 1623-1640.

Rosenfeld, et al., "Information Architecture for the World Wide Web", webpage available at http://www.oreilly.com/catalog/infotecture/.

"Category:Internet forum software" From Wikipedia the free encyclopedia, webpage available at http://en.wikipedia.org/wiki/Category:Internet_forum_software.

"Introduction to Algorithms, Second Edition" webpage available at http://mitpress.mit.edu/algorithms/.

Zheng, et al., "Joint Optimization of Wrapper Generation and Template Detection", SIGKDD 2007, San Jose California,USA. 28 Pages.

Song, et al., "Learning Important Models for Web Page Blocks based on Layout and Content Analysis", SIGKDD Explorations. vol. 6,Issue 2—pp. 14-23.

Datar, et al., "Locality-Sensitive Hashing Scheme Based on p-Stable Distributions", SCG'04, Jun. 9-11, 2004, Brooklyn, New York, USA. pp. 253-262.

Baeza-Yates, et al., "Modern Information Retrieval", webpage available at http://people.ischool.berkeley.edu/~hearst/irbook/.

Berners-Lee, et al., "Uniform Resource Locators (URL)" RFC 1738. Dec. 1994. pp. 1-25.

"Sitemaps XML format" webpage available at http://www.sitemaps.org/protocol.php.

Zhai, et al., "Structured Data Extraction from the Web Based on Partial Tree Alignment", IEEE Transactions on Knowledge and Data Engineering, vol. 18, No. 12, Dec. 2006. pp. 1614-1628.

Vidal, et al., "Structure-Driven Crawler Generation by Example", SIGIR'06, Aug. 6-11, 2006, Seattle, Washington, USA. pp. 292-299.

Broder, et al., "Syntactic Clustering of the Web", SRC Technical Note 1997-015. Jul. 25, 1997. pp. 1-13.

Brin, et al., "The Anatomy of a Large-Scale Hypertextual Web Search Engine", Computer Networks and ISDN Systems vol. 30, Issue 1-7 (Apr. 1998) pp. 107-117.

Pandey, et al.,"User-Centric Web Crawling", WWW 2005, May 10-14, 2005, Chiba, Japan. pp. 401-411.

Cai, et al., "VIPS: a Vision-based Page Segmentation Algorithm", Nov. 1, 2003 Technical Report. MSR-TR-2003-79. pp. 1-29.

International Search Report and Written Opinion for PCT Application No. PCT/US2009/040881, mailed on Dec. 7, 2009, 11 pages.

\* cited by examiner

FORUM WEB PAGE CLUSTERING BASED ON REPETITIVE REGIONS

BACKGROUND

User created content (UCC) is becoming an important data resource on the Internet. One popular type of user created content, directed towards user discussions, is referred to as a web forum (also named a bulletin board or discussion board). The data of a web forum are becoming very valuable for various web applications. For example, commercial search engines have begun to integrate forum data into their searches to improve the quality of search results. As another example, recent research efforts have tried to mine forum data to obtain useful information, such as business intelligence and expertise. In any such application, a general goal is to fetch data pages from various forum sites distributed over the Internet.

To download forum data effectively and efficiently, the characteristics of forums need to be understood, which involves understanding the forum pages and relationships between pages. Forum pages tend to be semi-structured, and are typically generated based upon pre-defined templates.

As a result of the structuring, the pages of a given forum site may be classified into several categories, in which each category represents a specific function. For example, generic forums usually have list-of-board pages, post-of-thread pages, user profile pages, and so forth; to extract post-of-thread content, identification of the post-of-thread pages is required.

Once classified, page classification may be used in forum page understanding, and for further analysis of forum data. Page classification is also valuable in forum crawling, e.g., page classification is a component used in recovering the structure of the forum site, and determine an optimized route for a crawler. Further, page classification can help filter out invalid pages and reduce duplicate pages; for example, the same pages (or other content) having different Uniform Resource Locators (URLs) are often generated for different requests, such as "view by date" or "view by title" requests.

To categorize forum pages, URL pattern analysis may be used, particularly with respect to sites hosted by commercial forum service providers. For example, "*/forumdisplay.php?fid=*" refers to list-of-post pages, while "*/viewthread.php?tid=*" refers to post-of-thread pages. However, in many cases, a URL is ambiguous and does not reveal a page's function. As one example, professional forums and communities of large enterprises usually define their own forms, whereby, for example, a URL such as "http://www.wxyz-forums.net/" provides no readily apparent URL patterns indicative of different types of pages.

Another technique used in categorizing forum pages utilizes Document Object Model (DOM) tree-based structure criterions to describe target pages. However, using DOM trees in forum sites for categorization does not provide a sufficient and robust solution, as similar pages may have different numbers of advertisements, images, and even complex sub-structures from user posts.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which web pages, particularly forum pages for example, are processed into clusters for classification purposes, including by determining repetitive regions in pages and selecting pages with similar repetitive regions for a common cluster. In one aspect, regions on forum web pages are determined, and those regions used to determine which forum web pages have similar regions for clustering purposes. In one implementation, patterns corresponding to the regions are determined, and a feature set based at least in part on those patterns (e.g., pattern frequency) is extracted from the page. The feature set of a page is compared against the feature set of another page to determine similarity therewith, e.g., via a feature space distance computation that is evaluated against a threshold distance.

In one aspect, a feature set may be based upon frequency of occurrence of repetitive patterns. Region area data, location data and/or size data are other possible features. Still other features that may be extracted and compared include an ordering of repetitive regions, a number of rows in repetitive regions, a number of columns in the repetitive regions, a URL pattern of links in the repetitive regions, and/or a pattern of anchor texts in the repetitive regions.

In one example aspect, once the clusters are obtained, a new page may be classified based on evaluation against the clusters. To this end, a feature set extracted from a new page is compared against sets of clustered pages to classify the new page based on feature set similarity to one of the sets of clustered pages. For example, the feature space distance to a cluster center is computed to determine whether a distance threshold is met, and if so, the new page is associated with that cluster.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards using repetitive regions that are present among forum pages to identify different types of forum pages. This takes advantage of the observation that for most forum sites, there is a common characteristic of the pages; forum pages, especially pages containing rich information, have strong patterns with respect to content layout.

In general, a repetitive region on a web page comprises a block area containing multiple data records in a uniform formation. For example, a region may include a list of thread records, with each record containing fields such as title and author of each thread. As described herein, repetitive regions are typical on forum pages, and significant information such as posts, navigation bars, advertisements, and so forth is shown in repetitive regions.

A repetitive pattern is generally an abstract representation of the records in a repetitive region; a repetitive region may be treated as an instance of a repetitive pattern on a related page. In one example implementation, a repetitive pattern may be described via a tree structure basically comprising an extended DOM tree with regular expression-like signs for each node. In one example implementation, each different repetitive pattern discovered in a forum site may be indexed with a unique identifier.

As described herein, the repetitive patterns and regions are processed to identify the category and function of a forum page. A forum page may be characterized by its layout, e.g., by what kinds of repetitive regions it contains, and possibly by where these regions are located on the page. Based on such layout information, the forum pages may be effectively clustered into categories.

While the examples described herein are generally directed towards using repetitive regions for categorization of forum pages, it is readily understood that this is only one such usage. For example, repetitive region-based categorization may be used with other types of documents. Further, repetitive region-based categorization may be combined with other categorization techniques, e.g., it may used in conjunction with URL-based categorization (e.g., for sub-clustering) and/or DOM-based categorization.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and classification in general.

Figure 1:
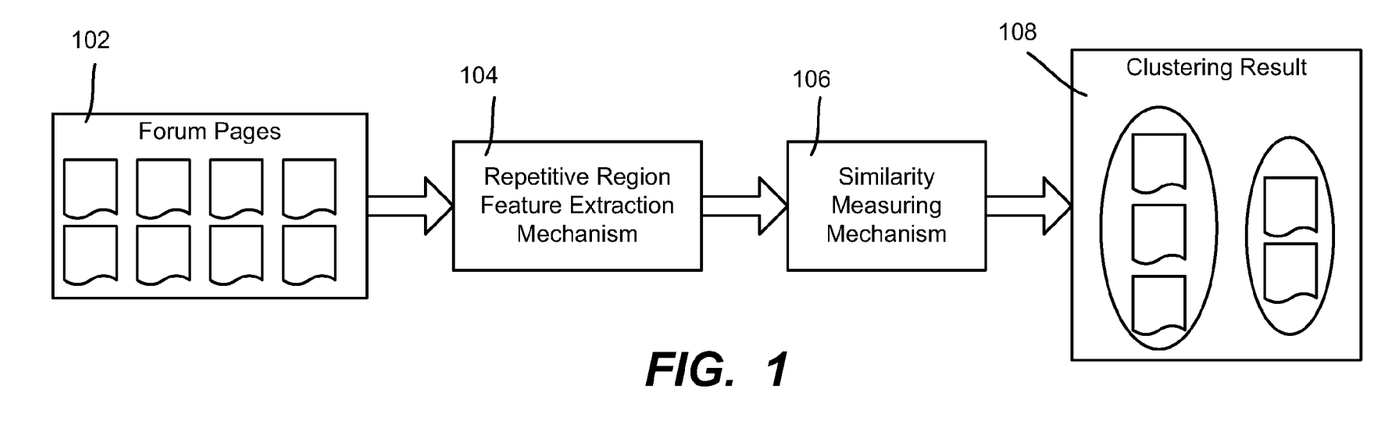
FIG. 1 is a block diagram representing example components directed towards forum web page clustering based on repetitive regions.

Turning to FIG. 1, a clustering process automatically groups pages with similar content layout (e.g., generated by the same templates) by comparing their distances in feature space as constructed by repetitive patterns. FIG. 1 shows forum pages 102 that are to be clustered being input into a feature extraction mechanism 104 by which the features of the pages are extracted. Then, the distance between each pair of feature samples are computed by a feature similarity measuring mechanism 106. A clustering result 108 is provided, comprising the pages clustered into one or more groups based upon the feature distance between the pages.

FIGS. 2A-2D are representations of four rendered pages, in which components such as post titles, authors, post dates, advertisement links, and navigation bars are displayed in a repetitive manner. The repetitive regions are marked by ellipses, in which like different types of lines (e.g., continuous, dashed, dotted) of the ellipses indicate which regions are similar.

Although the examples show gray stripes rather than specific text, it is readily apparent from these examples that different types of pages have dissimilar repetitive patterns in their layouts. More particularly, FIGS. 2A and 2B correspond to list-of-post pages 202 and 203, respectively, while FIGS. 2C and 2D correspond to post-of-thread pages 204 and 205, respectively.

Figure 2A:
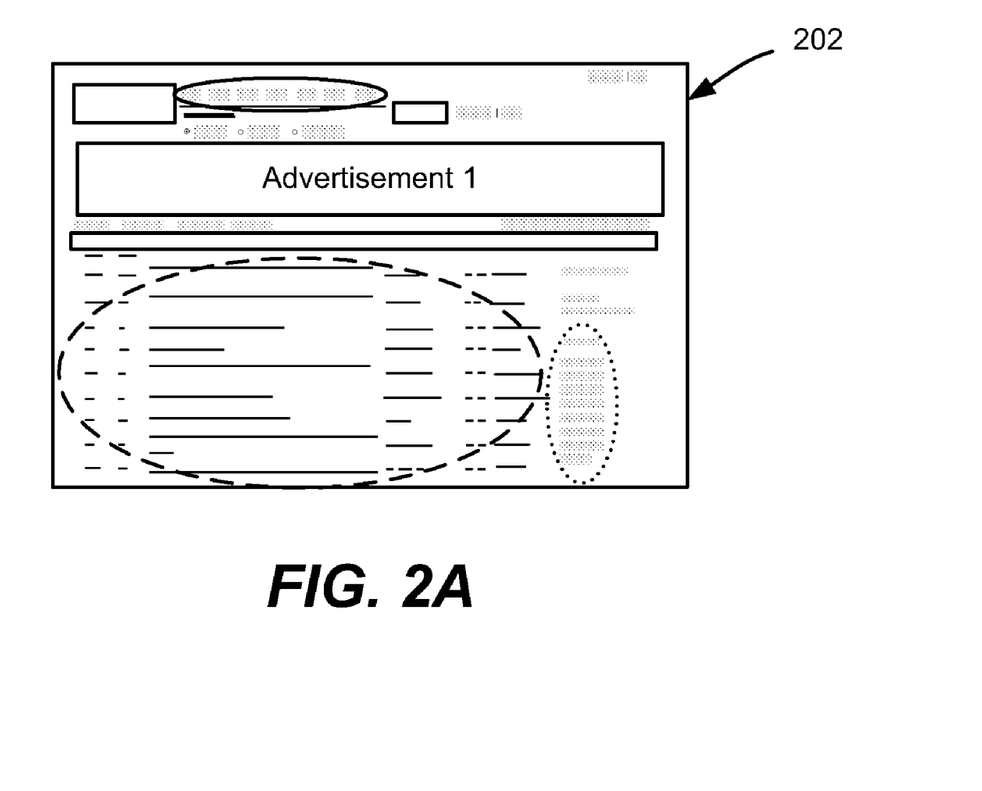
FIGS. 2A-2D are representations of rendered web pages showing detection of repetitive regions.
Figure 2B:
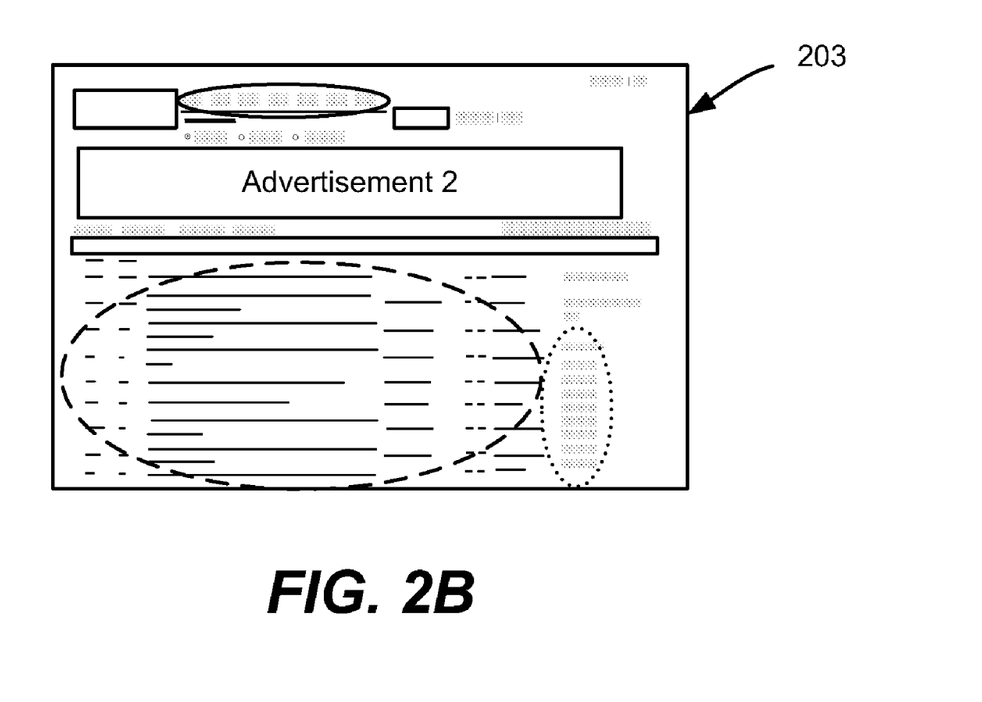
Figure 2C:
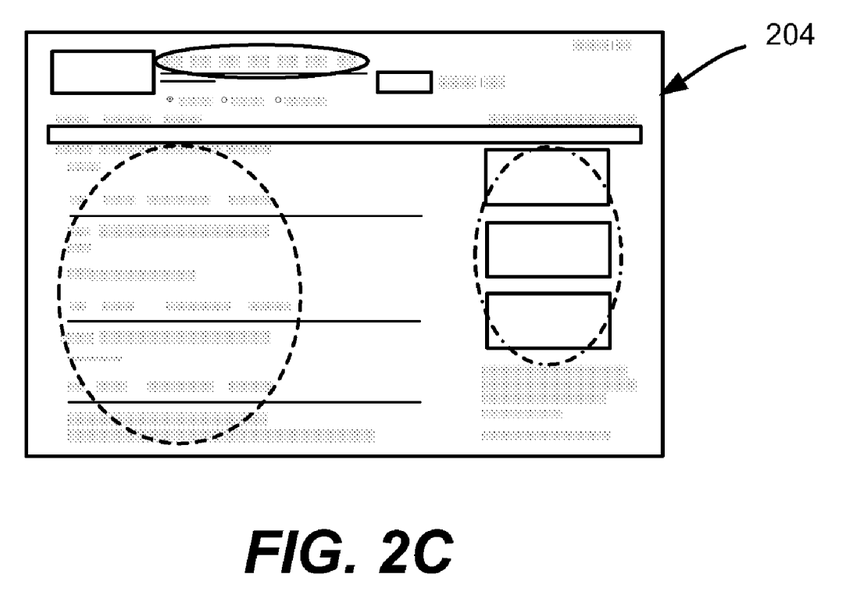
Figure 2D:
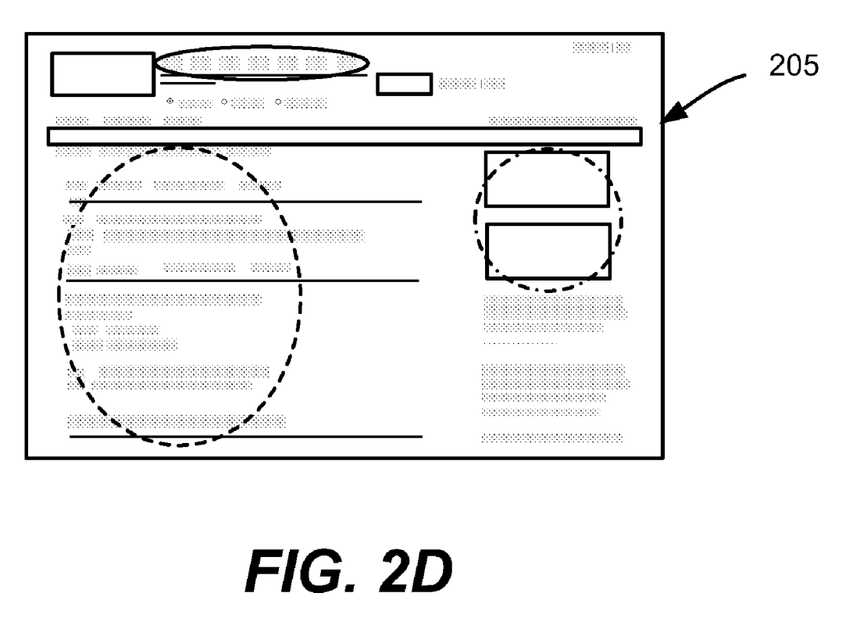
Figure 3:
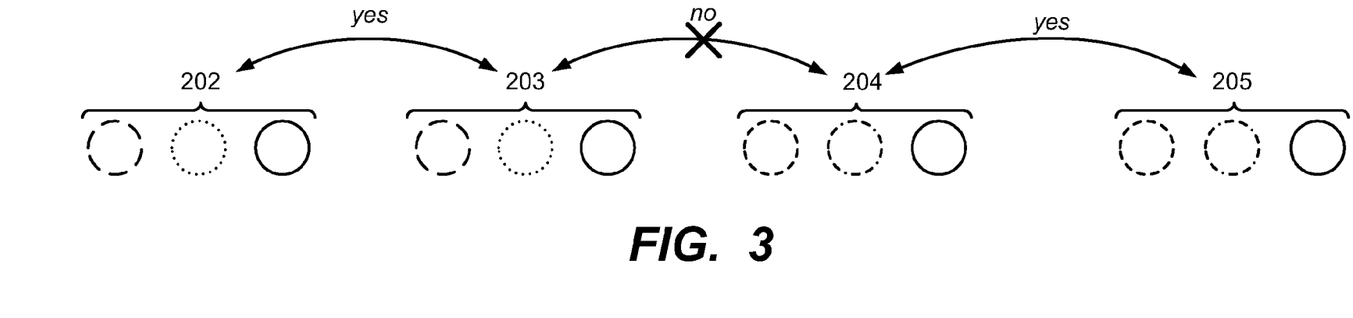
FIG. 3 is a representation of which sets of repetitive regions are alike and not alike based on patterns.

FIG. 3 is a representation of how the regions are used in determining whether pages are similar. In FIG. 3, the ellipse patterns overlaid on pages 202 and 203 (of FIGS. 2A and 2B) are each represented as large-dashed, dotted, solid; those of pages 204 and 205 (of FIGS. 2C and 2D) are each represented as small-dashed, dashed/dotted mix, solid. By comparing the repetitive regions as indicated by the line-patterned ellipses, pages 202 and 203 are deemed similar to each other, while being distinguished from pages 204 and 205, (which themselves are deemed similar to each other).

Note that in FIGS. 2A and 2B, the page contains two distinct banner images of advertisements, however because each page has one such banner image, the advertisements are not marked as a repetitive region; in one example implementation, repetitive regions contain at least two elements.

In general, page classification based upon repetitive regions is often more robust than using DOM tree-based classification. For example, the DOM tree structure of a post-of-thread page having only two posts is quite different from that of another page having twenty posts, and thus such pages may not be considered alike. However, two such two pages do have the same kind of a repetitive region, namely a region comprising posts, whereby repetitive region processing may properly identify such otherwise different kinds of pages.

Turning to feature extraction, a descriptor may be defined to represent the repetitive region information in a feature space, which facilitates quantitative computing. Based on this, a similarity measure between two pages may be defined. In the similarity measure, various factors of repetitive regions, such as the location of the regions, size of the regions, and the occurrence frequency of the repetitive patterns may be considered in making an effective comparison of pages. Note that in one example implementation, the order of the repetitive regions is not used as a feature. However, in alternative implementations, order information may be among the features of a page, and used as part of the distance measure computation.

Additional features may be used in the distance measurement, such as location of the repetitive regions, e.g., including left, right, top and bottom positions. Others feature may be based on the number of rows and/or columns in the repetitive regions, a URL pattern of links, and/or a pattern of anchor texts in the repetitive regions.

An example process of repetitive pattern-based feature extraction is represented in the flow diagram of FIG. 4, which also generally corresponds to the pseudo-code below:

```
input: a set of sampled Web pages 𝕊 and a threshold ε
output: 1) a list of discovered repetitive patterns
        ℙ; and
        2) a set of feature descriptions 𝔽 for pages
in 𝕊
    begin
        ℙ = φ; 𝔽 = φ;
        foreach s ∈ 𝕊 do
            ℝ = RepetitiveRegionDetection(s);
            foreach r ∈ ℝ do
                create an empty p* = {p_tree*, p_area*, p_support* }
                p_tree* = AlignRecordsInRegion(r);
                p_area* = area of r / screen area; p_support* = 1;
                foreach p^i ∈ ℙ do
                    if TreeAlignmentCost(p_tree*, p_tree^i) < ε
                        then p^i = Update(p^i, p*) and break;
                end // foreach p^i ∈ ℙ do loop
                if cannot align p* with any p^i ∈ ℙ then ℙ ← p*;
            end // foreach r ∈ ℝ do loop
            f = [n^1, n^2, ..., n^{||ℙ||}], n^i = number of p^i occurs in s;
            𝔽 ← f;
        end // foreach s ∈ 𝕊 do loop
    end // for begin
```

Note that the RepetitiveRegionDetection, AlignRecordsInRegion, and TreeAlignmentCost algorithms are described by Y. Zhai and B. Liu in the reference "*Structured data extraction from the Web based on partial tree alignment,*" IEEE Trans. Knowl. Data Eng., 18(12):1614-1628, December 2006; and by S. Zheng, R. Song, J.-R. Wen, and D. Wu in the reference "*Joint optimization of wrapper generation and template detection*" In Proc. $13_{th}$ KDD, pages 894-902, San Jose, Calif., USA, August 2007.

In general, the output of this process generates a pattern for every repetitive region r in every page s, and investigates whether the pattern being evaluated (p*) can be matched with any existing pattern ($p^i$) in the list $\mathbb{P}$. Step 402 represents initializing the sets to null sets and selecting a page, with step 404 detecting the regions and step 406 selecting a region. Step 408 creates an empty pattern structure for filling based on tree alignment, area and number of page data $\{p_{tree}^*, p_{area}^*, p_{support}^*\}$. Note that data records in a repetitive region may be extracted by aligning the DOM tree with one or more corresponding repetitive patterns. The records may be stored, e.g., with link-related fields retained to construct a link table for each repetitive region.

The features only partially represent a page's characteristics. More particularly, different patterns have different capabilities in distinguishing forum pages; patterns tend to be important to users if they have large rendering sizes on the screen, as users tend to pay attention to salient blocks on a page and ignore small ones. Also popular patterns are unimportant; note that patterns appearing on all of the pages are removed before clustering.

Because of differences in patterns, in one implementation two parameters, namely $p_{area}^i$ and $p_{support}^i$, are used to describe a pattern besides the tree structure $p_{tree}^i$. In one example implementation, the rendering information is based upon known Vision-based Page Segmentation (VIPS). Then, $p_{area}^i$ is the average area ratio of the repetitive regions generated by $p^i$, and $p_{support}^i$ is the number of pages having such repetitive regions. These $p_{area}^i$ are normalized to sum to one, and are taken as weights of patterns in distance measure. Moreover, similar to the well-known "term frequency-inverse document frequency" (or TF×IDF) in text retrieval, the page feature f is further revised by integrating $p_{support}^i$, to lessen the influence of those frequent (popular) patterns, as:

$$f_i = \left(n^i / \sum_{j=1}^{\|\mathbb{P}\|} n^j\right) \times \log_{10}(\|\mathbb{S}\| / p_{support}^i) \quad 1)$$

The distance between two pages $s_a$ and $s_b$ is defined as:

$$dist(s_a, s_b) = \sqrt{\sum_{i=1}^{\|\mathbb{P}\|} p_{area}^i \times (f_a^i - f_b^i)^2} \quad 2)$$

As there is no prior knowledge about how many kinds of pages may exist in the target forum, in clustering, a single linkage algorithm is utilized to agglomerate these pages in a hierarchical way. The agglomeration is stopped when the minimum distance between pages of each cluster is larger than a pre-defined threshold.

Returning to FIG. 4, step 410 selects a pattern p* and tries to match it to an existing pattern $p^i$ based on alignment cost (step 412). If matched with an existing pattern (as repeatedly attempted via steps 416 and 418), the existing pattern $p^i$ is updated with p* at step 414; otherwise p* is added to $\mathbb{P}$ as a new pattern at step 422.

When the repetitive regions processed following steps 424 and 426, at step 428 the feature description f is created for this page s by recording $n^i$, comprising the number of existing patterns $p^i$ that occur in s, considering that in a page there may be several regions that are generated by the same pattern.

Figure 4:
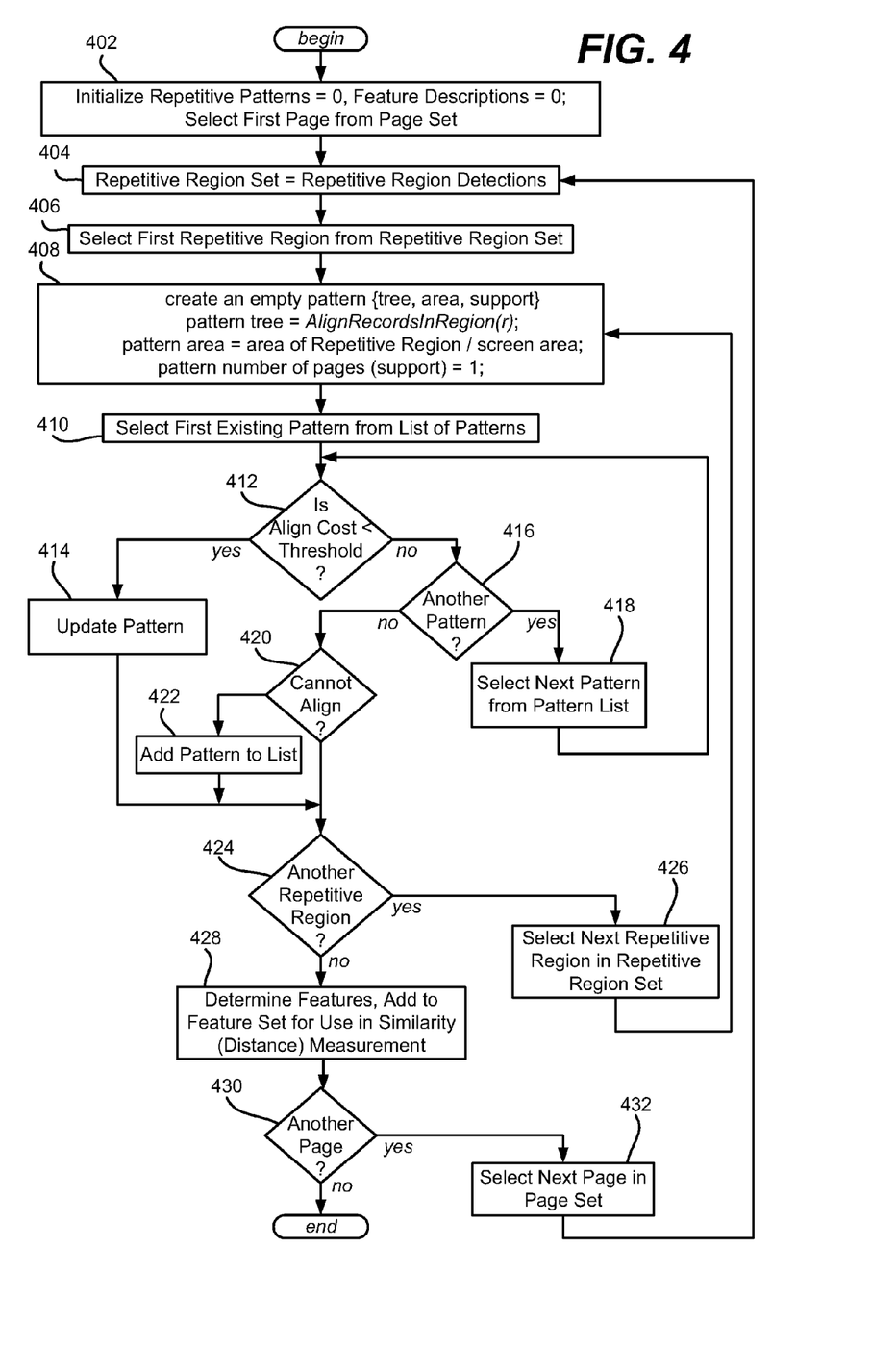
FIG. 4 is a flow diagram showing example steps of a process to discover repetitive patterns and generate feature descriptions for sampled pages.
Figure 5:
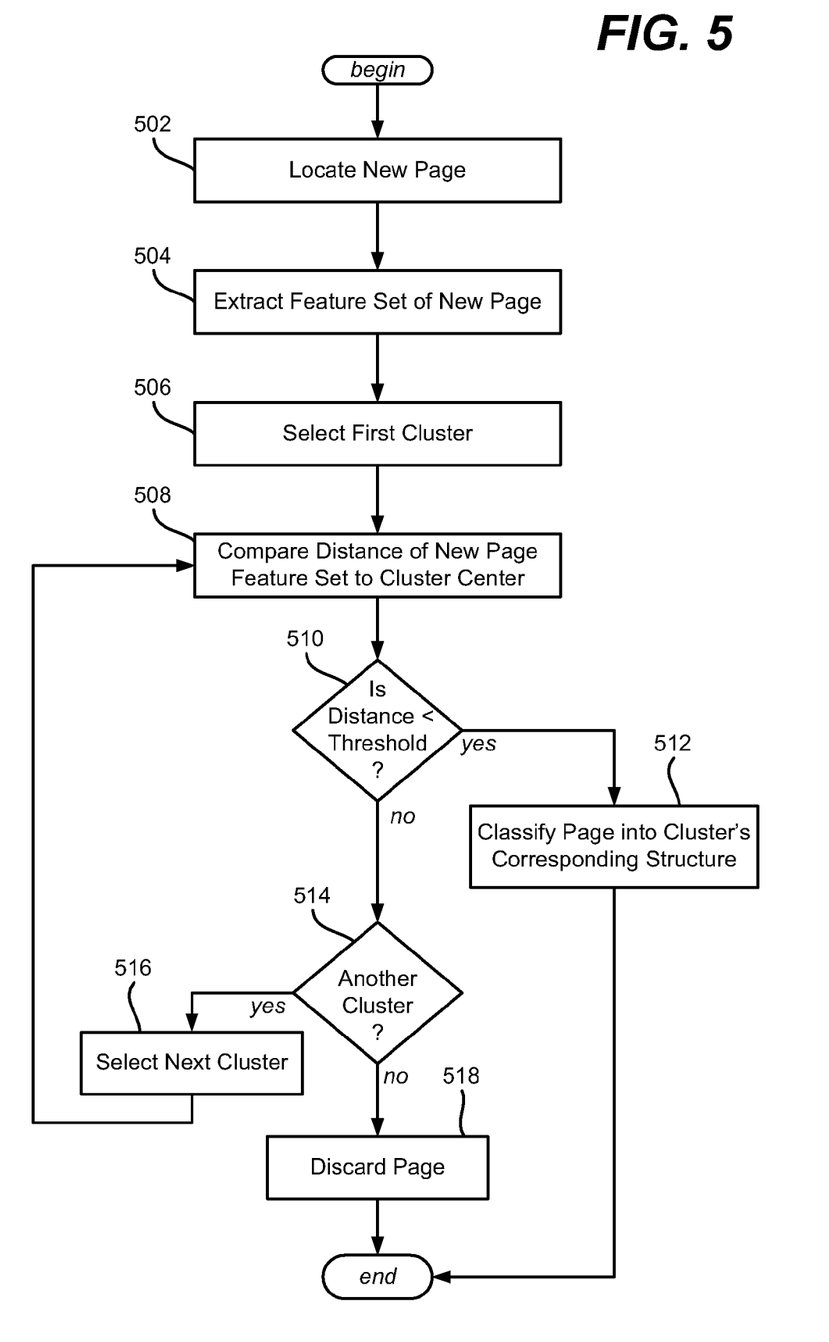
FIG. 5 is a flow diagram showing example steps for categorizing a new page based on existing sets of clustered pages.

Once the clusters have been decided as in the example steps of FIG. 4, the clusters may be used to classify a new page, such as in online crawling. FIG. 5 is a flow diagram showing example steps that may be taken to do so, beginning at step 502 where a new page is located, followed by step 504 where the feature set f is extracted for the new page. A cluster is selected at step 506, and at step 508 the distance in feature space is compared to the cluster center. If at step 510 the minimum distance is less than a clustering threshold distance, the new page is classified into the corresponding cluster at step 512. If not, the process repeats (steps 514 and 516) with each other cluster until the page is classified or no more clusters remain, in which event the classification attempt fails and this page is discarded at step 518.

Exemplary Operating Environment

Figure 6:
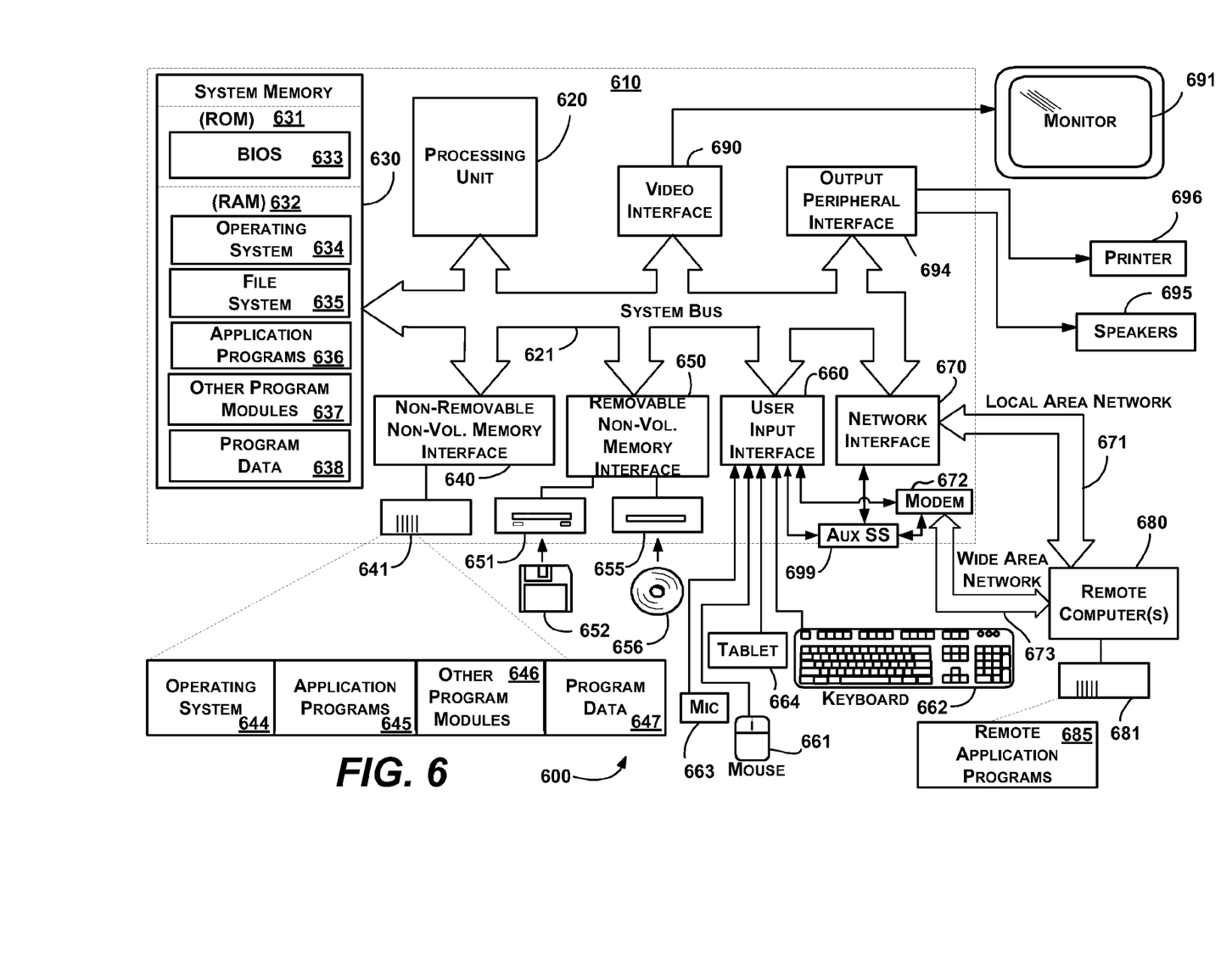
FIG. 6 shows an illustrative example of a computing environment into which various aspects of the present invention may be incorporated.

FIG. 6 illustrates an example of a suitable computing and networking environment 600 in which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component 674 such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   detecting repetitive regions on forum web pages, wherein each repetitive region comprises a block area that includes multiple data records in a uniform formation;
   generating a pattern from each repetitive region, wherein each pattern is an abstract representation of the multiple data records of its corresponding repetitive region;
   determining which forum web pages have similar regions with which other of the forum web pages based on the patterns, wherein the determining comprises extracting a feature set from each forum web page including region-based features, and wherein the feature sets include the generated patterns, and wherein the feature sets comprise locations of the repetitive regions, sizes of the repetitive regions, and occurrence frequencies of the patterns; and
   clustering forum web pages into categories based on their similar regions.

2. The method of claim 1 wherein extracting the feature sets comprises determining an ordering of the repetitive regions, a number of rows in the repetitive regions, a number of columns in the repetitive regions, a URL pattern of links in the repetitive regions, or a pattern of anchor texts in the repetitive regions, or any combination of a number of rows, a number of columns, a URL pattern of links, or a pattern of anchor texts.

3. The method of claim 1 wherein determining which forum web pages have similar regions comprises extracting a feature set for each page and comparing their distances in feature space.

4. The method of claim 1 further comprising, comparing a feature set of a new page against sets of clustered pages to classify the new page based on feature set similarity to one of the sets of clustered pages.

5. The method of claim 4 wherein comparing the feature set of the new page comprises evaluating a feature space distance to a cluster center to determine whether a distance threshold is met.

6. In a computing environment, a system comprising:
   a processing unit;
   a feature extraction mechanism implemented at least in part by the processing unit and configured to extract features of web pages including region-based features, wherein the features include patterns generated from repetitive regions and wherein each pattern is an abstract representation of multiple data records of its corresponding repetitive region and wherein the features further include location of the repetitive regions and size of the repetitive regions and occurrence frequency of the patterns; and a similarity measurement mechanism implemented at least in part by the processing unit and coupled to the feature extraction mechanism, the similarity measurement mechanism configured to compare similarities between pages based on distances between each pair of their features, and to cluster similar pages together.

7. The system of claim 6 wherein the feature extraction mechanism is further configured for extracting a feature set from each page including a number of patterns on each page.

8. The system of claim 6 wherein the feature extraction mechanism is further configured for extracting a feature set from each page including locations of the repetitive regions, sizes of the repetitive regions, occurrence frequencies of the repetitive patterns, an ordering of the repetitive regions, a number of rows in the repetitive regions, a number of columns in the repetitive regions, a URL pattern of links in the repetitive regions, or a pattern of anchor texts in the repetitive regions, or any combination of the locations of the repetitive regions, the sizes of the repetitive regions, the occurrence frequencies of the repetitive patterns, the number of the rows, the number of the columns, the URL pattern of the links, or the pattern of the anchor texts.

9. The system of claim 6 wherein the similarity measurement mechanism computes a distance in feature space between pages to determine similarity, including performing a computation based on area data and pattern frequency data.

10. The system of claim 6 wherein the similarity measurement mechanism is configured for lessening an influence due to frequent patterns.

11. The system of claim 6 further comprising the processor further configured for comparing a feature set of a new page against sets of clustered pages to classify the new page.

12. The system of claim 6 further comprising the processor further configured for evaluating a feature space distance to a cluster center to determine whether a distance threshold is met.

13. At least one computer-readable storage medium storing computer-executable instructions that, when executed by a computer, cause the computer to perform processing of a plurality of pages into clusters, the processing including:
   determining repetitive regions between pages of the plurality of pages and selecting pages of the plurality of pages with similar repetitive regions for a common cluster, wherein each repetitive region comprises a block area that includes multiple data records in a uniform formation; and
   generating a pattern from each repetitive region, wherein each pattern is an abstract representation of the multiple data records of its corresponding repetitive region, and wherein the determining comprises extracting features from each of the pages including region-based features, and wherein the features include the generated patterns, and wherein the features comprise locations of the repetitive regions, sizes of the repetitive regions, and occurrence frequencies of the patterns.

14. The at least one computer-readable storage medium of claim 13 wherein the determining the repetitive regions between pages comprises determining whether patterns corresponding to one page's regions align with any existing patterns of other pages.

15. The at least one computer-readable storage medium of claim 13 wherein the selecting the pages with similar repetitive regions comprises comparing the features of two pages.

16. The at least one computer-readable storage medium of claim 13, the processing further comprising:
   locating a new page;
   extracting features from the new page; and
   selecting one of the clusters for the new page based on similarity of the extracted features of the new page to features of at least one of the clusters.

* * * * *